Nov. 7, 1950 J. M. LEAKE 2,529,088
METHOD OF MAKING ONE-PIECE ANGULAR FRAME MEMBERS
Filed Sept. 16, 1947

INVENTOR.
James M. Leake

Patented Nov. 7, 1950

2,529,088

UNITED STATES PATENT OFFICE 2,529,088

METHOD OF MAKING ONE-PIECE ANGULAR FRAME MEMBERS

James M. Leake, Monroe, Mich.

Application September 16, 1947, Serial No. 774,314

1 Claim. (Cl. 29—148)

This invention relates to a method of making a sheet metal frame member with an angle shaped cross section. This invention relates more particularly to the making, from a plurality of sheet metal strips, a continuous or one piece frame member of exact shape and size.

One object of my invention is to make a continuous or endless frame member of angular cross section from a plurality of flat strips of sheet metal.

Another object of my invention is to make a frame member, with an angular cross section, with very definite shape and size.

Another object of my invention is to provide a method of making an endless frame member of angular cross section that is adapted to quantity production.

Another object of my invention is to provide a method of making an endless sheet metal frame member in which an unlimited quantity of frame members of uniform size and shape can be produced.

Another object of my invention is to provide a method of making endless frame members of angular cross section that is strong, durable and inexpensive.

These and other objects of my invention will be more clearly understood from the description in the specification.

Heretofore angular frame members have been made by cutting pieces of angular cross sectional stock into the desired lengths and then welding them into a one piece member. With this method of construction frame members it is possible only to make frame members with sharp corners such as square and rectangular shaped members. With my improved method of making frame members of angle shaped cross section it is possible to produce practically any shape of frame. For example with my improved method it is possible to make round, oval shaped frame members, rectangular frame members with rounded or many other odd or irregular shaped frame members. With the old method of welding together angular members it is impossible to make a large number of frame members of exactly the same size. With my improved method the frame member is formed under tremendous pressure. Under this pressure the metal flows and is formed into very definite shape in a die.

The way the frame member of angular cross section is manufactured is illustrated in the accompanying drawings in which.

Figure 1:
Figure 1 is a front elevation of one of the strips of sheet metal used in making the frame member.
Figure 2:
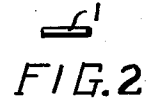
Figure 2 is an end view of the strip of sheet metal shown in Figure 1.
Figure 3:
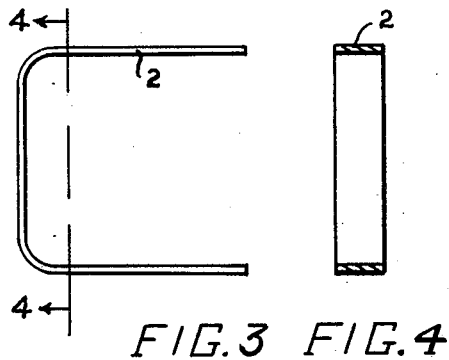
Figure 3 shows the strip of sheet metal formed into a substantially U-shaped member.
Figure 4:
Figure 4 is a sectional view taken along line 4—4 of Figure 3.
Figure 5:
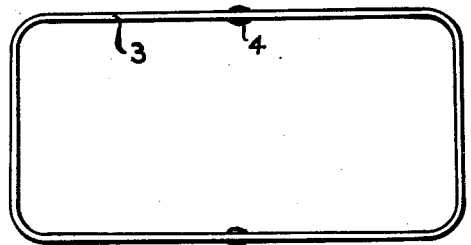
Figure 5 shows two U-shaped metal strips welded into a continuous frame member.
Figure 6:
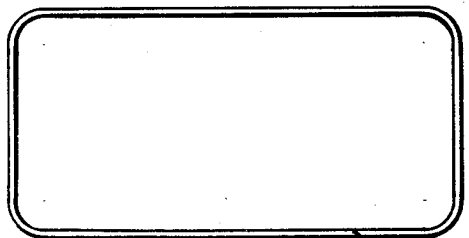
Figure 6 shows the continuous frame after the welds have been smoothed or ground off.
Figure 7:
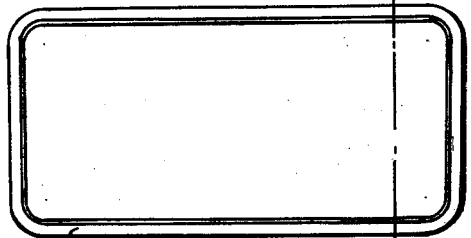
Figure 7 shows the frame member after the angle has been partially formed.
Figures 8, 9:
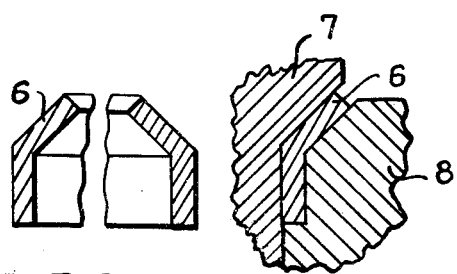
Figure 8 is a sectional view taken along line 8—8 of Figure 7.
Figure 9 is a sectional view showing the frame member in the dies.
Figure 10:
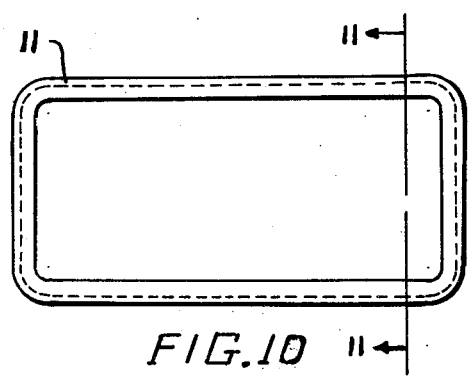
Figure 10 is a top plan view of the finished frame member.

Referring to the drawings:

The blank 1 is a flat strip of metal which has been cut to the proper size. Two of these blanks are required to make my sheet metal frame member. The blank 1 is then bent, preferably in a pair of dies, into a U-shaped member 2 as shown in Figure 3. Two of the U-shaped members 2 are placed with their ends abutting and are then welded together into a one piece frame member 3 as shown in Figure 5. In the welding process thickened portions 4 are formed at the welded joints. The excess metal is ground off to form a continuous frame member 5 of uniform thickness. The frame member 5 is then placed in a press (not shown) and pressed into a frame member 6, which has an oblique-angle cross section, by means of a pair of dies 7 and 8. Figure 8 is an enlarged cross-sectional view of the frame member after it has been pressed between the dies 7 and 8. The frame member 6 is then pressed into a frame member 11 with a right angle cross section by means of a pair of dies 9 and 10. In the final pressing operation the frame member is completely confined between the dies 9 and 10 and a pressure great enough to cause the metal of the frame member to flow is applied to the frame member. If the metal of the frame is subjected to a pressure great enough to cause the metal to flow, the frame 11 takes a definite shape and size. In this way frame members with precision size and shape can be produced in large quantities at a minimum of cost.

Figures 11, 12:
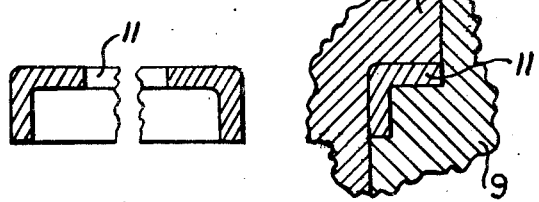
Figure 11 is a sectional view taken along line 11—11 of Figure 10.
Figure 12 is a sectional view through the finish forming dies and the frame member.

Figure 11 is a sectional view of the frame member 11 after the frame member has been completed. Figure 12 is a sectional view showing the frame member 11 completely confined between the dies 9 and 10.

When the two U-shaped members are welded together to form a continuous frame member 3 the size of the frame is not uniform when produced in quantities. In my method of making a continuous frame member of angular cross section any variation in size of the frame member is corrected in the final pressing operation where the frame member is completely confined between the dies 9 and 10 while a pressure, great enough to cause the metal of the frame to flow, is applied.

The pressure required to cause the metal to flow varies depending on the thickness of the metal, the size of the frame and the kind or type of metal used.

While I have described one method of making a continuous or one piece frame member of angular cross section it will be readily noted by those skilled in the art that many variations in my process can be made. For example the frame member I have shown is substantially rectangular. It can readily be seen that round, oval or other polygonal shaped frame members can be made by the same method. Also it is possible to make angular frame members with an angular cross section that is other than a right angle.

From the above it will be apparent, to those skilled in the art, that many modifications may be made from the method described without departing from the scope of my invention. Hence I do not wish to be limited to the method shown and described.

Having thus described my invention, what I claim is:

The method of making a closed frame member of generally rectangular outline, of right-angle cross-section, and of precise predetermined dimensions, comprising the steps of bending two flat metal strips about lines in the plane of the strips to form two U-shaped members with long straight legs, abutting the free ends of the legs of said U-shaped members and welding said ends together to form a continuous one-piece frame member of generally rectangular outline and of rectangular cross-section corresponding to that of the original strip, removing any excess material formed in the welding process, die-pressing said one-piece frame member without changing its generally rectangular outline to form it to be a uniform obtuse-angle cross-section having one leg of the obtuse angle perpendicular to the bottom plane of the frame and the inclined leg of the cross-section extending inwardly within the frame, and finally die-pressing said frame member without changing its generally rectangular outline by completely confining the cross-section in dies subjected to a sufficient pressure to cause the metal of said frame to flow and form a frame of precise predetermined dimensions and with walls of right angle cross-section, the leg of the cross-section which was originally perpendicular to the bottom plane of the frame remaining thus perpendicular, the other leg extending inwardly within the frame.

JAMES M. LEAKE.

REFERENCES CITED

The following references are of record in the file of this patent:

UNITED STATES PATENTS

| Number | Name | Date |
|---|---|---|
| 1,140,567 | Newell | Oct. 8, 1912 |
| 1,493,516 | Bohle | May 13, 1924 |
| 1,536,038 | Bishop | Apr. 28, 1925 |
| 1,580,930 | Thackray | Apr. 13, 1926 |
| 1,581,680 | Guerity | Apr. 20, 1926 |
| 1,623,325 | Wetmore | Apr. 5, 1927 |
| 1,660,493 | Proctor | Feb. 28, 1928 |
| 1,865,570 | Kellogg | July 5, 1932 |
| 1,892,754 | Tarbox | Jan. 3, 1933 |
| 1,914,179 | Strickland | June 13, 1933 |
| 1,958,467 | Buckle | May 15, 1934 |
| 1,966,723 | Ireland | July 17, 1934 |
| 1,999,482 | Riemenschneider | Apr. 30, 1935 |
| 2,366,487 | Burgess | Jan. 2, 1945 |
| 2,430,437 | Trautretter | Nov. 4, 1947 |

FOREIGN PATENTS

| Number | Country | Date |
|---|---|---|
| 353,820 | Great Britain | July 30, 1931 |
| 361,069 | Great Britain | July 1, 1931 |